(12) United States Patent
Li et al.

(10) Patent No.: US 12,207,061 B2
(45) Date of Patent: Jan. 21, 2025

(54) SIGNAL PROCESSING METHOD AND DEVICE OF MEMS MICROPHONE AND MEMS MICROPHONE

(71) Applicant: GOERTEK INC., Shandong (CN)

(72) Inventors: Dingyun Li, Shandong (CN); Kang An, Shandong (CN); Jie Wu, Shandong (CN); Kaifa Shu, Shandong (CN); Zheng Yang, Shandong (CN); Zongxia Zhu, Shandong (CN); Feifei Han, Shandong (CN)

(73) Assignee: GOERTEK INC., Shandong (CN)

( * ) Notice: Subject to any disclaimer, the term of this patent is extended or adjusted under 35 U.S.C. 154(b) by 116 days.

(21) Appl. No.: 17/929,024

(22) PCT Filed: Dec. 16, 2020

(86) PCT No.: PCT/CN2020/136797
§ 371 (c)(1),
(2) Date: Aug. 10, 2022

(87) PCT Pub. No.: WO2021/232767
PCT Pub. Date: Nov. 25, 2021

(65) Prior Publication Data
US 2023/0083805 A1 Mar. 16, 2023

(30) Foreign Application Priority Data
May 19, 2020 (CN) .......................... 202010425443.0

(51) Int. Cl.
*H04R 29/00* (2006.01)
*B81B 3/00* (2006.01)
(Continued)

(52) U.S. Cl.
CPC ......... *H04R 29/004* (2013.01); *B81B 3/0021* (2013.01); *H04R 1/083* (2013.01);
(Continued)

(58) Field of Classification Search
CPC ........ H04R 29/004; H04R 1/083; H04R 3/04; H04R 23/008; H04R 2201/003;
(Continued)

(56) References Cited

U.S. PATENT DOCUMENTS 10,484,799 B1* 11/2019 Ye ............................. H04R 3/00
11,463,830 B2* 10/2022 Svajda ..................... H04R 3/00
(Continued)

FOREIGN PATENT DOCUMENTS

CN 103581447 A 2/2014
CN 205812390 U 12/2016
(Continued)

*Primary Examiner* — Xu Mei
(74) *Attorney, Agent, or Firm* — LKGlobal | Lorenz & Kopf, LLP

(57) ABSTRACT

A signal processing method and device of a MEMS microphone and a MEMS microphone are disclosed. The method comprises: acquiring a first electrical signal obtained by converting a received optical signal by an optical sensor disposed near a sound hole of the MEMS microphone; acquiring a second electrical signal output by the MEMS microphone; and judging that the second electrical signal is an interference signal when within a substantially overlapping time range, the first electrical signal acquired reaches a preset first threshold value and the second electrical signal acquired meets a preset condition.

17 Claims, 3 Drawing Sheets

(51) Int. Cl.
*H04R 1/08* (2006.01)
*H04R 3/04* (2006.01)
*H04R 23/00* (2006.01)

(52) U.S. Cl.
CPC .............. *H04R 3/04* (2013.01); *H04R 23/008* (2013.01); *B81B 2201/0257* (2013.01); *B81B 2203/0127* (2013.01); *B81B 2207/015* (2013.01); *H04R 2201/003* (2013.01)

(58) Field of Classification Search
CPC ...... H04R 3/007; H04R 19/005; H04R 19/04; H04R 17/02; H04R 17/025; H04R 1/04; H04R 1/2846; B81B 3/0021; B81B 2201/0257; B81B 2203/0127; B81B 2207/015; G06F 21/75; G10L 15/22; G10L 2015/223
USPC ................ 381/172, 190, 191, 111, 114, 115

See application file for complete search history.

(56) References Cited

U.S. PATENT DOCUMENTS

| | | | |
|---|---|---|---|
| 11,910,154 B2* | 2/2024 | Neumaier | H04R 1/04 |
| 2003/0016838 A1* | 1/2003 | Paritsky | H04R 23/008 |
| | | | 381/172 |
| 2005/0142684 A1 | 6/2005 | Miles | |
| 2011/0038492 A1* | 2/2011 | Ronald | H04R 23/006 |
| | | | 381/172 |
| 2016/0150327 A1* | 5/2016 | Qutub | G01J 1/44 |
| | | | 381/172 |
| 2018/0091910 A1 | 3/2018 | Porter et al. | |
| 2023/0254635 A1* | 8/2023 | Leahy | H04R 1/2846 |
| | | | 381/113 |

FOREIGN PATENT DOCUMENTS

| | | |
|---|---|---|
| CN | 106409309 A | 2/2017 |
| CN | 206908858 U | 1/2018 |
| CN | 109506764 A | 3/2019 |
| CN | 110531513 A | 12/2019 |
| CN | 110650418 A | 1/2020 |
| CN | 210491199 U | 5/2020 |
| CN | 111654794 A | 9/2020 |
| JP | 2013101345 A | 5/2013 |

* cited by examiner

SIGNAL PROCESSING METHOD AND DEVICE OF MEMS MICROPHONE AND MEMS MICROPHONE

CROSS-REFERENCE TO RELATED APPLICATION

This Application is a U.S. National Stage entry under 35 U.S.C. § 371 based on International Application No. PCT/CN2020/136797, filed on Dec. 16, 2020, which was published under PCT Article 21(2) and which claims priority from the Chinese patent application No. 202010425443.0 filed with the China Patent Office on May 19, 2020 and entitled "Signal Processing Method and Device of MEMS microphone and MEMS Microphone", which are all hereby incorporated herein in their entirety by reference.

TECHNICAL FIELD

This application pertains to the technical field of signal processing. More specifically, the present disclosure relates to a signal processing method of a MEMS microphone, a signal processing device of a MEMS microphone, and a MEMS microphone.

BACKGROUND

The MEMS microphone is an acoustoelectric transducer made by micromachining technology, and has the characteristics of small volume, good frequency response, low noise, etc. With the development of miniaturization and thinness of electronic devices, MEMS microphones are more and more widely used in these devices.

The MEMS microphone comprises a MEMS chip and an ASIC chip electrically connected with the MEMS chip. The capacitance of MEMS chip will change with different input sound signals, and then ASIC chip is used to process and output the changed capacitance signals to realize sound pickup. The MEMS chip may comprise a substrate having a back cavity, and a diaphragm and a back plate that are supported on the substrate, and the diaphragm is separated from the back plate. The sound hole of the MEMS microphone is connected with the back cavity, and the external sound and air flow can directly enter the back cavity of the MEMS chip. When the external sound or air flow enters the back cavity of the MEMS chip, the diaphragm of the MEMS chip vibrates and generates an electrical signal to realize the acoustoelectric conversion function.

However, it is found that the speech signal can be modulated to the laser, and when the laser modulated with speech signal is irradiated on the MEMS microphone, the MEMS microphone will recognize the speech signal modulated in the laser. Based on the principle that MEMS microphone can sense the laser signal modulated with sound and recognize the sound signal, the laser can be used to attack the MEMS microphone, so that it can interact with the intelligent voice device equipped with MEMS microphone without producing a sound. For example, an attacker can use the laser to command an intelligent voice device to unlock, shop online, start a vehicle remotely, and perform a series of sensitive operations.

Therefore, it is necessary to provide a new signal processing method of a MEMS microphone. In addition, other objects, desirable features and characteristics will become apparent from the subsequent summary and detailed description, and the appended claims, taken in conjunction with the accompanying drawings and this background.

SUMMARY

The object of the present disclosure is to provide a new technical solution for signal processing of a MEMS microphone.

According to a first aspect of an embodiment of the present disclosure, there is provided a signal processing method of a MEMS microphone, comprising:
  acquiring a first electrical signal obtained by converting a received optical signal by an optical sensor disposed near a sound hole of the MEMS microphone;
  acquiring a second electrical signal output by the MEMS microphone; and
  judging that the second electrical signal is an interference signal when within a substantially overlapping time range, the first electrical signal acquired reaches a preset first threshold value and the second electrical signal acquired meets a preset condition Optionally, the preset condition that the second electrical signal meets comprises:
  the second electrical signal reaches a preset second threshold value.

Optionally, the preset condition that the second electrical signal meets comprises:
  performing speech recognition on the second electrical signal and obtaining a preset control instruction.

Optionally, the step of judging that the second electrical signal is an interference signal when within a substantially overlapping time range, the first electrical signal acquired reaches a preset first threshold value and the second electrical signal acquired meets a preset condition comprises:
  synchronously acquiring the first electrical signal and the second electrical signal;
  starting time counting when the first electrical signal acquired at a same time point reaches a preset first threshold value and the second electrical signal acquired at the same time point reaches a preset second threshold value; and
  judging that the second electrical signal is an interference signal when speech recognition is performed on the second electrical signal and a preset control instruction is obtained within a preset time period.

Optionally, the step of judging that the second electrical signal is an interference signal when speech recognition is performed on the second electrical signal and a preset control instruction is obtained within a preset time period comprises:
  judging whether the second electrical signal matches a preset speech recognition model; and
  if yes, determining that the speech recognition is performed on the second electrical signal and the preset control instruction is obtained.

Optionally, the method further comprises:
shielding the interference signal.

Optionally, the method further comprises:
prohibiting execution of the preset control instruction.

Optionally, the method further comprises:
outputting the second electrical signal when the first electrical signal does not reach a preset first threshold value.

According to a second aspect of an embodiment of the present disclosure, there is provided a signal processing device of a MEMS microphone, comprising:

a first acquisition module for acquiring a first electrical signal obtained by converting a received optical signal by an optical sensor disposed near a sound hole of the MEMS microphone;

a second acquisition module for acquiring a second electrical signal output by the MEMS microphone; and a judgment module for judging that the second electrical signal is an interference signal when within a substantially overlapping time range, the first electrical signal acquired reaches a preset first threshold value and the second electrical signal acquired meets a preset condition.

According to a third aspect of an embodiment of the present disclosure, there is provided a signal processing device of a MEMS microphone comprising a processor and a memory, wherein the memory stores computer instructions, and when the computer instructions are run by the processor, the method provided in the first aspect of the embodiment of the present disclosure is executed.

According to a fourth aspect of the embodiment of the present disclosure, there is provided a MEMS microphone comprising a MEMS microphone body and an optical sensor, wherein the MEMS microphone body is provided with a sound hole, and the optical sensor is disposed near the sound hole of the MEMS microphone body;

the optical sensor is for acquiring a first electrical signal obtained by converting an optical signal received;

the MEMS microphone body is for outputting a second electrical signal.

Optionally, an optical response frequency band of the optical sensor is ultraviolet frequency band, and/or visible frequency band, and/or infrared frequency band.

Optionally, the optical sensor comprises a photosensitive element, and the photosensitive element is a photosensitive resistor, a photosensitive diode or a photosensitive triode.

According to the embodiments of the present disclosure, by acquiring the first electrical signal output by the optical sensor disposed near the sound hole of the MEMS microphone and the second electrical signal output by the MEMS microphone, and when within a substantially overlapping time range, the first electrical signal acquired reaches the preset first threshold value and the second electrical signal acquired meets the preset condition, the second electrical signal is judged as an interference signal, so as to avoid mistaking the second electrical signal for a signal obtained by conversion from the picked up sound signal by the MEMS microphone, and prevent the back-end electronic equipment from giving feedback to the control instruction generated according to the interference signal, and thus improve the safety of using the MEMS microphone.

Other features and advantages of the embodiments of the present disclosure will become apparent from the following detailed description of the exemplary embodiments of the embodiments of the present disclosure with reference to the accompanying drawings.

BRIEF DESCRIPTION OF DRAWINGS

The present invention will hereinafter be described in conjunction with the following drawing figures, wherein like numerals denote like elements, and.

DETAILED DESCRIPTION

Figure 1:
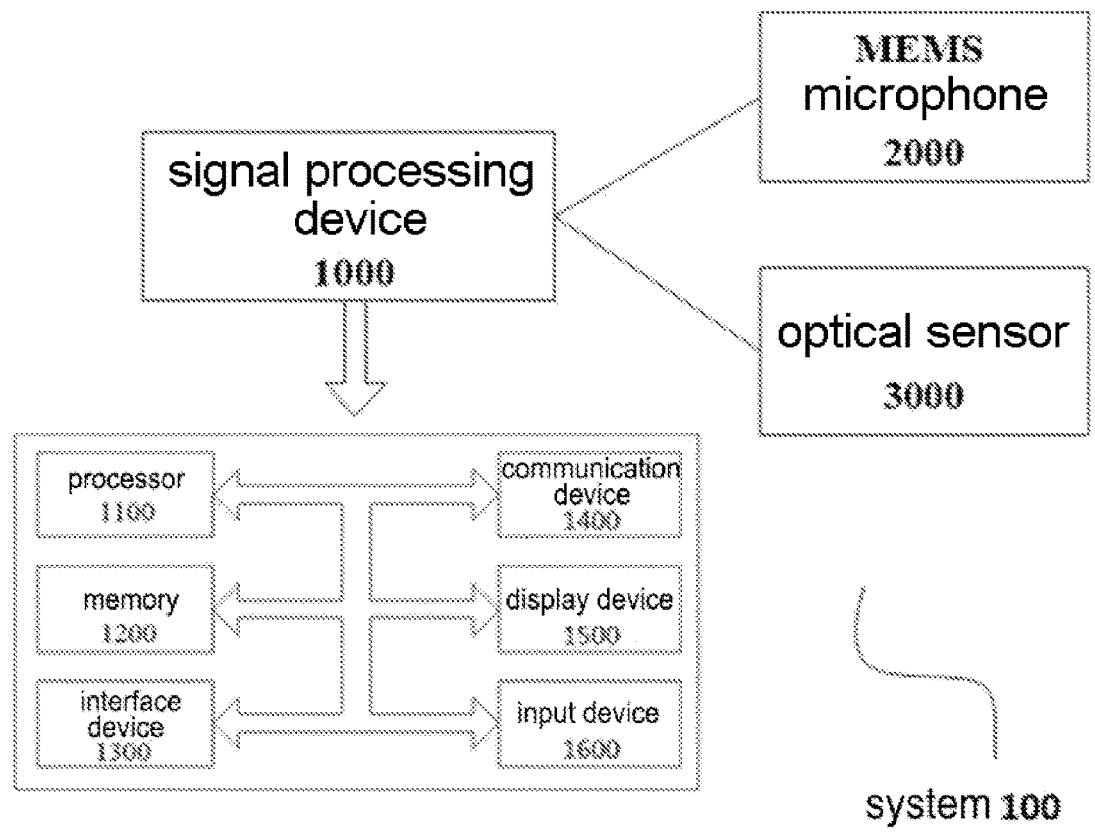
FIG. 1 is a schematic diagram of hardware configuration of a system that can be used to implement an embodiment of the present disclosure.

The following detailed description is merely exemplary in nature and is not intended to limit the invention or the application and uses of the invention. Furthermore, there is no intention to be bound by any theory presented in the preceding background of the invention or the following detailed description.

Various exemplary embodiments of the present disclosure will now be described in detail with reference to the accompanying drawings. It should be noted that, unless otherwise specified, the relative arrangement of components and steps, numerical expressions, and numerical values set forth in these embodiments do not limit the scope of the embodiments of the present disclosure.

The following description of at least one exemplary embodiment is in fact only illustrative and in no way intended to limit the present disclosure and its application or use.

The techniques, methods and equipment known to those of ordinary skill in the art may not be discussed in detail, but when appropriate, these techniques, methods and equipment shall be regarded as a part of the specification.

In all the examples shown and discussed herein, any specific value should be interpreted as merely exemplary and not as a limitation. Therefore, other examples of the exemplary embodiments may have different values.

It should be noted that similar reference numerals and letters indicate similar items in the following drawings. Therefore, once an item is defined in a drawing, it does not need to be further discussed in subsequent drawings.

Hardware Configuration

FIG. 1 is a schematic diagram of hardware configuration of a system that can be used to implement an embodiment of the present disclosure. The system 100 comprises: a signal processing device 1000, a MEMS microphone 2000, and an optical sensor 3000 disposed near a sound hole of the MEMS microphone 1000. The signal processing device 1000 is electrically connected with the MEMS microphone 2000 and the optical sensor 3000 to acquire the electrical signal output by the MEMS microphone 2000 and the electrical signal converted by the optical sensor 3000 from the received optical signal.

In an embodiment, the signal processing device 1000, the MEMS microphone 2000 and the optical sensor 3000 may be integrated in one device. That is to say, the system 100 may be an intelligent voice device, a smart home, an intelligent terminal with speech recognition function, etc. that is equipped with the MEMS microphone and optical sensor. For example, the system 100 may be a smart speaker, a smart phone, or a smart door lock.

In an embodiment, as shown in FIG. 1, the processing device 1000 may comprise a processor 1100, a memory 1200, an interface device 1300, a communication device 1400, a display device 1500, and an input device 1600. The processor 1100 may be, for example, a central processing unit CPU, a microprocessor MCU, or the like. The memory 1200 includes, for example, a ROM (read only memory), a RAM (random access memory), a nonvolatile memory such as a hard disk, or the like. The interface device 1300 includes, for example, a USB interface, a serial interface, or the like. The communication device 1400 can perform wired or wireless communication, for example. The display device 1500 is, for example, a liquid crystal display, an LED display, a touch screen, or the like. The input device 1600 includes, for example, a touch screen, a keyboard, or the like. Although a plurality of devices are shown for the signal processing device 1000 in FIG. 1, the present disclosure may relate only to some of these devices, for example, the signal processing device 1000 relates only to the processor 1100 and the memory 1200.

In the embodiments of the present disclosure, the memory 1200 of the signal processing device 1000 is used to store instructions for controlling the processor 1100 to operate so as to realize the signal processing method of a MEMS microphone according to any embodiment provided in the first aspect of the present disclosure. A technician may design instructions according to the disclosed solution of the embodiments of the present disclosure. How the instructions control the processor to operate is well known in the art, and thus will not be described in detail here.

The system 100 shown in FIG. 1 is only explanatory and in no way intended to limit the present disclosure, its application or use.

Method Embodiment

Figure 2:
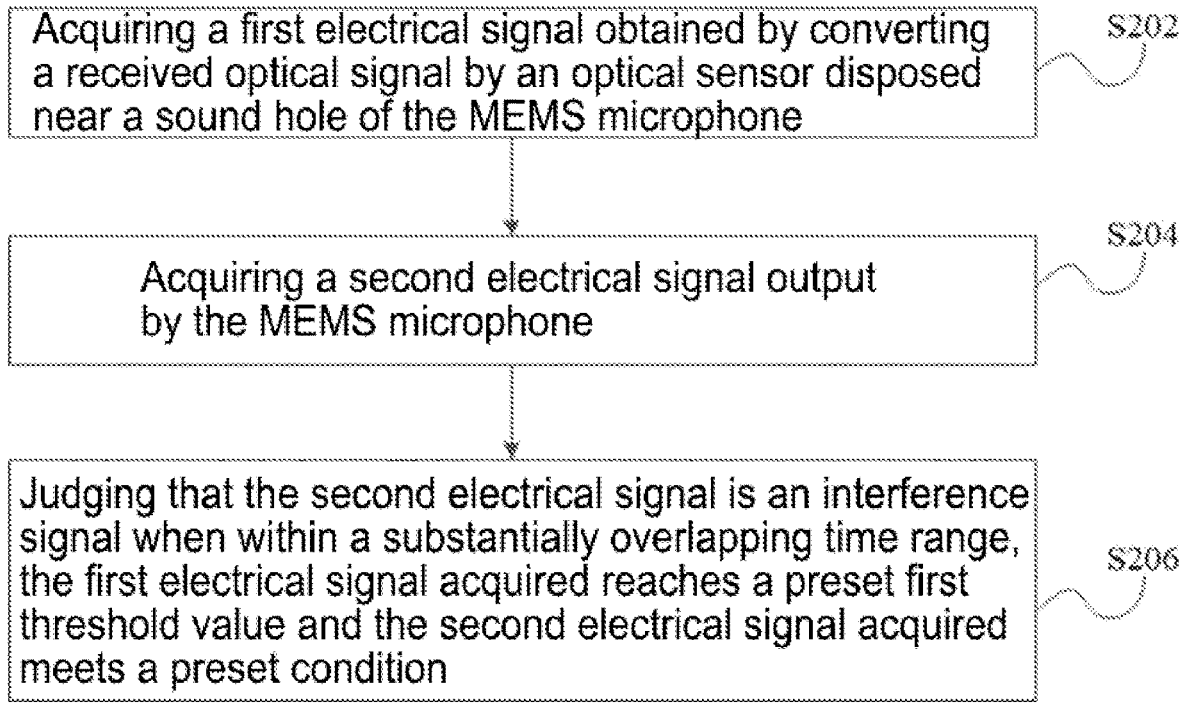
FIG. 2 is a schematic flowchart of a signal processing method of a MEMS microphone according to an embodiment of the present disclosure.

Referring to FIG. 2, the signal processing method of a MEMS microphone according to an embodiment of the present disclosure is described. The method relates to a signal processing device, which may be the signal processing device 1000 as shown in FIG. 1. The signal processing method of a MEMS microphone comprises the following steps:

Step 202: acquiring a first electrical signal obtained by converting a received optical signal by an optical sensor disposed near a sound hole of the MEMS microphone.

In this embodiment, the optical sensor is used to convert the received optical signal to obtain a first electrical signal and output the first electrical signal. The optical sensor is disposed near the sound hole of the MEMS microphone to detect whether there is a light beam irradiating the MEMS microphone.

In a specific example, the signal processing device is electrically connected with the optical sensor to obtain a first electrical signal output by the optical sensor. In addition, the signal processing device can judge whether there is a light beam irradiating the MEMS microphone according to the first electrical signal output by the optical sensor. According to this embodiment of the present disclosure, by acquiring the first electrical signal output by the optical sensor disposed near the sound hole of the MEMS microphone, it can be judged whether there is a light beam irradiating the MEMS microphone, and further it can be detected whether the MEMS microphone is attacked by a light beam, so as to avoid the back-end electronic equipment from giving feedback to the control instruction generated according to the interference signal, and improve the safety of using the MEMS microphone.

Step 204: acquiring a second electrical signal output by the MEMS microphone.

In an embodiment, the second electrical signal may be generated by the vibration of the diaphragm of the MEMS microphone when an external sound enters the back cavity of the MEMS microphone.

In an embodiment, the second electrical signal may be generated as follows. When the MEMS microphone is irradiated by a laser, the laser pulse will heat the diaphragm of the MEMS microphone, and the expansion of the heated air around the diaphragm of the MEMS microphone will form pressure on the diaphragm of the MEMS microphone, thereby causing the diaphragm of the MEMS microphone to vibrate. Alternatively, the second electrical signal may also be generated by making the diaphragm of the MEMS microphone vibrate when the laser modulated with the voice signal is irradiated on the MEMS microphone. That is to say, when the MEMS microphone is irradiated by a light beam, the diaphragm of the MEMS microphone will also vibrate and output a second electrical signal.

The signal processing device is electrically connected with the MEMS microphone to obtain the second electrical signal output by the MEMS microphone. The signal processing device can judge whether the second electrical signal is generated by the MEMS microphone irradiated by a light beam according to the first electrical signal and the second electrical signal acquired.

Step 206: judging that the second electrical signal is an interference signal when within a substantially overlapping time range, the first electrical signal acquired reaches a preset first threshold value and the second electrical signal acquired meets a preset condition.

In an embodiment, the signal processing device stores the first electric signal and the second electric signal acquired, and marks the time of acquiring the first electric signal and the time of acquiring the second electric signal, respectively. When the time of acquiring the first electrical signal and the time of acquiring the second electrical signal are within a substantially overlapping time range, it is judged whether the first electrical signal reaches a preset first threshold value and whether the second electrical signal meets a preset condition. When the first electrical signal reaches the preset first threshold value and the second electrical signal meets the preset condition, it is considered that the second electrical signal is generated by the MEMS microphone irradiated by a light beam, and the second electrical signal is determined as an interference signal.

In an embodiment, the time of acquiring the first electrical signal and the time of acquiring the second electrical signal are within a substantially overlapping time range may refer to that the first electrical signal and the second electrical signal are acquired at the same time point. The time of acquiring the first electrical signal and the time of acquiring the second electrical signal are within a substantially overlapping time range may also refer to that the time difference between the time of acquiring the first electrical signal and the time of acquiring the second electrical signal is within a preset time range.

The process of judging whether the first electrical signal reaches a preset first threshold value will be described below.

The signal processing device compares the first electrical signal with a preset first threshold value to determine whether the MEMS microphone is irradiated by a light beam. When the first electrical signal reaches a preset first threshold value, it is judged that the MEMS microphone is irradiated by a light beam. When the first electrical signal does not reach the preset first threshold value, it is judged that the MEMS microphone is not irradiated by the light beam. For example, when the optical sensor is not stimulated externally, the first electrical signal is the electrical signal from the optical sensor itself. At this point, the first electrical signal does not reach the first threshold value, so it can be determined that the MEMS microphone is not irradiated by a light beam. For another example, when the MEMS microphone is in normal use, the optical sensor will be irradiated by natural light or illumination light. At this point, the first electrical signal obtained from the conversion by the optical sensor is far less than the first threshold value, so it can be determined that the MEMS microphone is not irradiated by a light beam.

In this embodiment, the first threshold value may be preset, and the preset first threshold value may be set according to engineering experience or simulation experiments, which is not limited herein. Alternatively, the first threshold value may be set according to the type of optical sensor. For example, the optical sensor may be a photoresistor. When the photoresistor is not irradiated by a light beam, the resistance value of the photoresistor is large, generally greater than 1 megaohm; when the photoresistor is irradiated by a light beam, the resistance value of the photoresistor becomes smaller, generally less than several thousand ohms. That is to say, when a constant voltage is applied to the photoresistor, the change of current in the circuit of the photoresistor can be detected to determine whether the photoresistor is irradiated by a light beam, i.e., whether the MEMS microphone is irradiated by a light beam. At this point, the first electrical signal acquired by the signal processing device is the current value in the circuit of the photosensitive resistor, and the first threshold value is a preset first current threshold value. When the first electrical signal is greater than or equal to the preset threshold value of the first current value, it is judged that the MEMS microphone is irradiated by a light beam.

When the first electrical signal reaches a preset first threshold value, it is further judged whether the second electrical signal meets a preset condition. The signal processing device acquires the second electrical signal output by the MEMS microphone, judges whether the second signal meets the preset condition, and then judges whether the MEMS microphone performs acoustoelectric conversion. When the first electrical signal reaches the preset first threshold value and the second electrical signal meets the preset condition, it is considered that the second electrical signal is an electrical signal generated by acoustoelectric conversion when the MEMS microphone is irradiated by a light beam.

Optionally, the preset condition that the second electrical signal meets comprises: the second electrical signal reaches a preset second threshold value.

In an embodiment, the second threshold value may be preset, and the preset second threshold value may be set according to engineering experience or simulation experiments, which is not limited herein. For example, the second electrical signal may be the capacitance value of the MEMS chip of the MEMS microphone, and the preset second threshold value is the second capacitance threshold value. When the second electrical signal is greater than or equal to the preset second capacitance threshold value, it is considered that the second electrical signal meets the preset condition. At this point, it can be determined that acousto-electric conversion occurs in the MEMS microphone. When the second electrical signal is less than the preset second capacitance threshold value, it is considered that the second electrical signal does not meet the preset condition. At this point, it can be determined that the acoustoelectric conversion has not occurred in the MEMS microphone. For example, when the second electrical signal is less than the preset second capacitance threshold value, it is considered that the second electrical signal meets the preset condition. For example, when the MEMS microphone is in normal use, the chip of the MEMS microphone does not sense external stimulation, and the second electrical signal is the capacitance value of the chip itself of the MEMS microphone. At this point, the second electrical signal does not reach the second threshold value, so it can be determined that the acoustoelectric conversion has not occurred in the MEMS microphone. For another example, when the sound signal or the optical signal occurred is very weak, the second electrical signal generated by the chip of the MEMS microphone sensing the sound signal or the optical signal does not reach the second threshold value, it can be determined that the acoustoelectric conversion has not occurred in the MEMS microphone.

Alternatively, the preset condition that the second electrical signal meets comprises: performing speech recognition on the second electrical signal and obtaining a preset control instruction.

In an embodiment, speech recognition is performed on the second electrical signal to obtain a preset control instruction. The operation of other electronic devices can be controlled according to the preset control instruction. Other electronic devices may be electronic devices that establish a communication connection with the signal processing device. Other electronic devices may also be electronic devices integrated with signal processing devices. Other electronic devices may be intelligent voice devices, smart homes, intelligent terminals with speech recognition functions, etc. For example, the external devices can be smart speakers, smart phones, and smart door locks. The control instructions may be preset according to the use scenarios of other electronic devices. For example, in the scenario of using an intelligent door lock, the preset control instruction may be an instruction to control the opening and closing of the intelligent door lock. For another example, in the scenario of shopping using a smart phone, the preset control instruction may be an instruction to confirm payment.

In an embodiment, the signal processing method of a MEMS microphone may further comprise prohibiting the execution of the preset control instruction.

In this embodiment, when within a substantially overlapping time range, the first electrical signal acquired reaches a preset first threshold value and a preset control instruction is obtained by performing speech recognition on the second electrical signal, the execution of the preset control instruction is prohibited.

Alternatively, the step of judging that the second electrical signal is an interference signal when within a substantially overlapping time range, the first electrical signal acquired reaches a preset first threshold value and the second electrical signal acquired meets a preset condition may further comprise steps 302-306:

Step 302: synchronously acquiring the first electrical signal and the second electrical signal;

Step 304: starting time counting when the first electrical signal acquired at a same time point reaches a preset first threshold value and the second electrical signal acquired at the same time point reaches a preset second threshold value; and Step 306: judging that the second electrical signal is an interference signal when speech recognition is performed on the second electrical signal and a preset control instruction is obtained within a preset time period.

In an embodiment, the signal processing device synchronously acquires the first electrical signal and the second electrical signal, and stores the first electrical signal and the second electrical signal. The first electrical signal and the second electrical signal acquired at the same time point are selected, the first electrical signal is compared with the preset first threshold value, and the second electrical signal is compared with the preset second threshold value. When the first electrical signal reaches a preset first threshold value and the second electrical signal reaches a preset second threshold value, the second electrical signal is considered to be an electrical signal generated when the MEMS microphone is irradiated by a light beam. At this point, time counting is started and speech recognition is performed on the second electrical signal. It is further judged whether a preset control instruction is obtained by performing speech recognition on the second electrical signal. When a preset control instruction is obtained by performing speech recognition on the second electrical signal, time counting is stopped to obtain a counted time. It is judged whether the counted time is within a preset time period. When the counted time is within the preset time period, it is considered that the control instruction obtained according to the second electrical signal can be used to operate other electronic devices, that is, the second electrical signal is generated by the MEMS microphone irradiated by a light beam, and a control instruction for operating other electronic devices to perform corresponding operations can be obtained by performing speech recognition on the second electrical signal. At this point, the second electrical signal is judged as an interference signal, so as to avoid mistaking the second electrical signal for a signal obtained by conversion from the picked up sound signal by the MEMS microphone.

Alternatively, the step of judging that the second electrical signal is an interference signal when speech recognition is performed on the second electrical signal and a preset control instruction is obtained within a preset time period may further comprise steps 3062-3064:

Step 3062: judging whether the second electrical signal matches a preset speech recognition model; and Step 3064: if yes, determining that the speech recognition is performed on the second electrical signal and the preset control instruction is obtained.

In an embodiment, the speech recognition model may be preset. The speech recognition model is stored in the signal processing device. When the first electrical signal acquired at a same time reaches a preset first threshold value and the second electrical signal acquired at the same time reaches a preset second threshold value, the second electrical signal is input into a preset speech recognition model to obtain a recognition result. It is judged whether the recognition result is a preset control instruction. If the recognition result is a preset control instruction, the second electrical signal is considered as an interference signal.

In an embodiment, the signal processing method of a MEMS microphone may also comprise the step of shielding the interference signal.

According to the embodiment of the present disclosure, shielding the interference signal can prevent the control instruction generated according to the interference signal from controlling the electronic device connected to the MEMS microphone, and thus improve the safety of using the MEMS microphone.

In an embodiment, the signal processing method of a MEMS microphone may further comprise outputting a second electrical signal when the first electrical signal does not reach a preset first threshold value.

In this embodiment, when the first electrical signal does not reach the preset first threshold value, it is considered that the MEMS microphone is not irradiated by the light beam. At this point, the second electrical signal generated by the MEMS microphone is not an interference signal, and the second electrical signal can be directly output to control other electronic devices connected to the MEMS microphone to execute corresponding instructions according to the second electrical signal.

According to the embodiment of the present disclosure, by acquiring the first electrical signal output by the optical sensor disposed near the sound hole of the MEMS microphone and the second electrical signal output by the MEMS microphone, and when within a substantially overlapping time range, the first electrical signal acquired reaches the preset first threshold value and the second electrical signal acquired meets the preset condition, the second electrical signal is judged as an interference signal, so as to avoid mistaking the second electrical signal for a signal obtained by conversion from the picked up sound signal by the MEMS microphone, and prevent the back-end electronic equipment from giving feedback to the control instruction generated according to the interference signal, and thus improve the safety of using the MEMS microphone.

Device Embodiment 1

Figure 3:
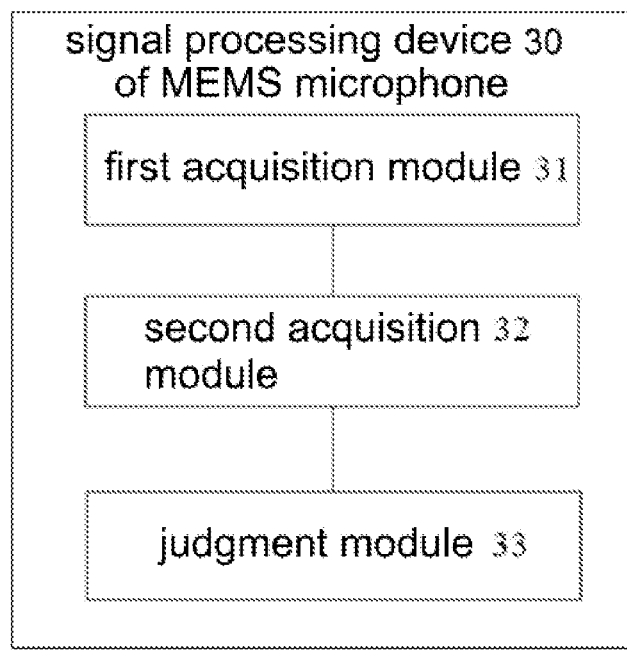
FIG. 3 is a block diagram of the structure of a signal processing device of a MEMS microphone according to an embodiment of the present disclosure.

Referring to FIG. 3, an embodiment of the present disclosure provides a signal processing device 30 of a MEMS microphone, which may be, for example, a signal processing device 1000 as shown in FIG. 1.

The signal processing device 30 of a MEMS microphone comprises a first acquisition module 31, a second acquisition module 32, and a judgment module 33.

The first acquisition module 31 can be used to acquire a first electrical signal obtained by converting a received optical signal by an optical sensor disposed near a sound hole of the MEMS microphone.

The second acquisition module 32 can be used to acquire a second electrical signal output by the MEMS microphone.

The determination module 33 can be used to judge that the second electrical signal is an interference signal when within a substantially overlapping time range, the first electrical signal acquired reaches a preset first threshold value and the second electrical signal acquired meets a preset condition.

In an embodiment, the preset condition that the second electrical signal meets comprises: the second electrical signal reaches a preset second threshold value.

In an embodiment, the preset condition that the second electrical signal meets comprises: performing speech recognition on the second electrical signal and obtaining a preset control instruction.

In an embodiment, the judgment module 33 may further be used to synchronously acquire the first electrical signal and the second electrical signal;

start time counting when the first electrical signal acquired at a same time point reaches a preset first threshold value and the second electrical signal acquired at the same time point reaches a preset second threshold value; and judge that the second electrical signal is an interference signal when speech recognition is performed on the second electrical signal and a preset control instruction is obtained within a preset time period.

Figure 4:
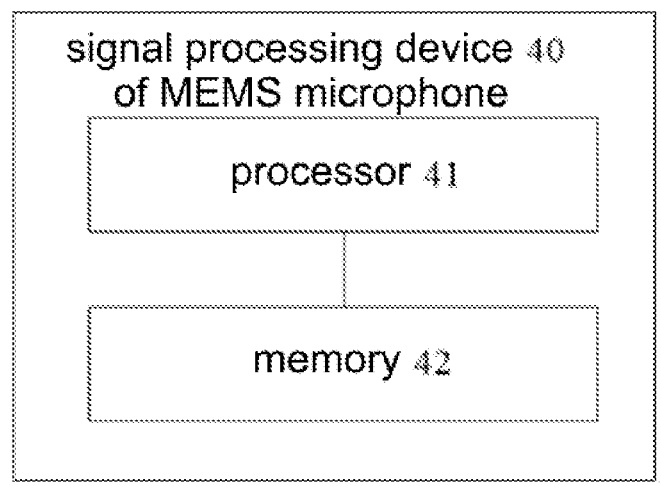
FIG. 4 is a block diagram of the structure of a signal processing device of a MEMS microphone according to an embodiment of the present disclosure.

Referring to FIG. 4, an embodiment of the present disclosure provides a signal processing device 40 of a MEMS microphone, which may be, for example, a signal processing device 1000 as shown in FIG. 1.

The signal processing device 40 of a MEMS microphone comprises a processor 41 and a memory 42. The memory 42 is used to store a computer program, which, when executed by the processor 41, implements the signal processing method of a MEMS microphone disclosed in any of the above embodiments.

Device Embodiment 2

Figure 5:
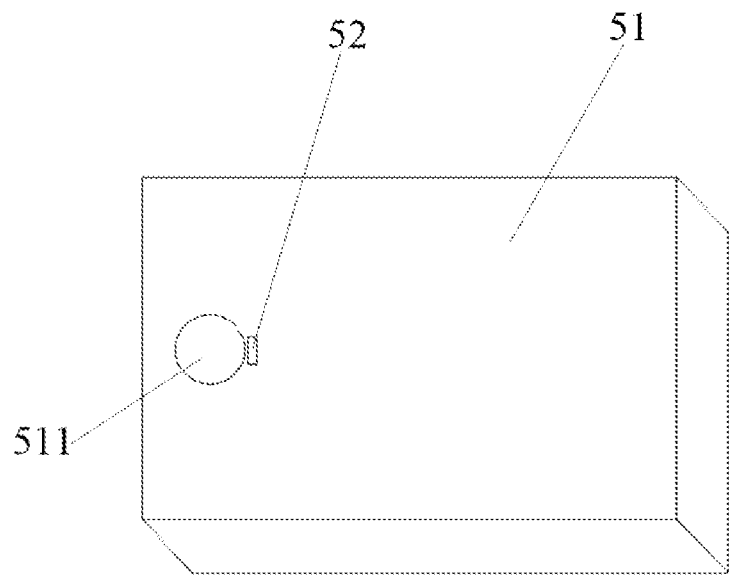
FIG. 5 is a schematic diagram of the structure of a MEMS microphone according to an embodiment of the present disclosure.

Referring to FIG. 5, an embodiment of the present disclosure provides a MEMS microphone, which comprises a MEMS microphone body 51 and an optical sensor 52. The MEMS microphone body 51 is provided with a sound hole 511, and the optical sensor 52 is disposed near the sound hole 511 of the MEMS microphone body 51.

The optical sensor 52 may be used to convert the received optical signal to obtain a first electrical signal.

The MEMS microphone body 51 may be used to output a second electrical signal.

The optical sensor 52 is disposed near the sound hole of the MEMS microphone body to detect whether a light beam irradiates the MEMS microphone, and the light beam can interfere with the MEMS microphone.

Figure 6:
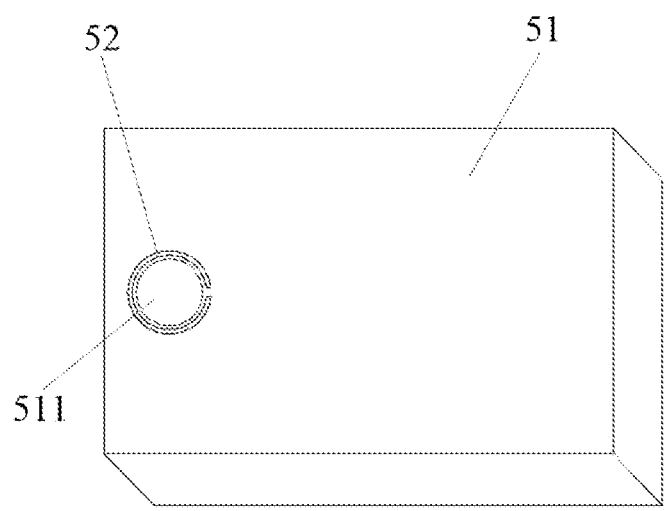
FIG. 6 is a schematic diagram of the structure of a MEMS microphone according to an embodiment of the present disclosure.

In an embodiment, the optical sensor 52 may be circular, strip-shaped, ring-shaped, etc. Various forms of optical sensors 52 can achieve the technical effects of the embodiments of the present disclosure, which are not limited herein. Alternatively, as shown in FIG. 6, the optical sensor 52 may be ring-shaped, and the optical sensor 52 can be disposed around the sound hole of the MEMS microphone, and even when the beam intensity is weak, it can also be detected in such an arrangement.

In an embodiment, the optical response frequency band of the optical sensor 52 is the ultraviolet frequency band, and/or the visible frequency band, and/or the infrared frequency band. The optical response band of the optical sensor 52 may be set according to the use scenarios of the MEMS microphone.

In an embodiment, the optical sensor 52 comprises a photosensitive element, which is a photosensitive resistor, a photodiode or a photosensitive triode.

The embodiments of the present disclosure may be a method, a device, a system and/or a computer program product. The computer program product may include a computer-readable storage medium loaded with computer-readable program instructions thereon for executing various aspects of the embodiments of the present disclosure.

The computer-readable storage medium may be a tangible device capable of holding and storing instructions used by the instruction executing device. The computer-readable storage medium may be, but not limited to, for example, electrical storage devices, magnetic storage devices, optical storage devices, electromagnetic storage devices, semiconductor storage devices or any random appropriate combinations thereof. More specific but non-exhaustive examples of the computer-readable storage medium include: portable computer disk, hard disk, random-access memory (RAM), read-only memory (ROM), erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any suitable combinations thereof. The computer-readable storage medium used herein is not interpreted as a transient signal itself such as radio wave or other freely propagated electromagnetic wave, electromagnetic wave propagated through waveguide or other transmission medium (such as optical pulses passing through fiber-optic cables), or electric signals transmitted through electric wires.

The computer-readable program instructions described here may be downloaded from the computer-readable storage medium to various computing/processing devices, or to external computers or external storage devices via a network such as the Internet, local area network, wide area network and/or wireless network. The network may comprise copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages. the programming languages include object-oriented programming languages, such as Smalltalk, C++, and conventional procedural programming languages, such as "C" language or similar programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including local area network (LAN) or wide area network (WAN), or connected to an external computer (such as via the Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

Various aspects of the present disclosure are described in reference with the flow chart and/or block diagram of the method, device (system) and computer program product according to the embodiments of the present disclosure. It should be understood that each block in the flow chart and/or block diagram and any combinations of various blocks thereof may be implemented by the computer-readable program instructions.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of the flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices may realize the functions/actions specified in one or more blocks of the flow chart and/or block diagram.

The accompanying flow chart and block diagram present possible architecture, functions and operations realized by the system, method and computer program product according to the embodiments of the present disclosure. At this point, each block in the flow chart or block diagram can represent a module, a program segment, or a portion of the instruction. The module, the program segment or the portion of the instruction includes one or more executable instructions for implementing specified logic functions. In some alternative implementations, the function indicated in the block can also occur in an order different from the one represented in the drawings. For example, two consecutive blocks actually can be executed in parallel, and sometimes they may also be executed in a reverse order depending on the involved functions. It should also be noted that each block in the block diagram and/or flow chart, and any combinations of the blocks thereof can be implemented by a dedicated hardware based system for implementing specified functions or actions, or a combination of the dedicated hardware and the computer instructions. It is well known to those skilled in the art that implementation by hardware, implementation by software, and implementation by a combination of software and hardware are all equivalent.

The embodiments of the present disclosure have been described above in an illustrative and non-exhaustive manner. The present disclosure is not limited to the embodiments disclosed herein. Various modifications and changes will be apparent to those skilled in the art without departing from the scope of the embodiments. The choice of terms used herein is intended to best explain the principles, practical applications, or technical improvements of the embodiments, or to enable other skilled persons in the art to understand the embodiments disclosed herein. The scope of the present disclosure is defined by the appended claims.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A signal processing method of a MEMS microphone, comprising:
   acquiring a first electrical signal obtained by converting a received optical signal by an optical sensor disposed near a sound hole of the MEMS microphone;
   acquiring a second electrical signal output by the MEMS microphone; and
   judging that the second electrical signal is an interference signal when within a substantially overlapping time range, the first electrical signal acquired reaches a preset first threshold value and the second electrical signal acquired meets a preset condition.

2. The method according to claim 1, wherein the preset condition that the second electrical signal meets comprises:
   the second electrical signal reaches a preset second threshold value.

3. The method according to claim 1, wherein the preset condition that the second electrical signal meets comprises:
   performing speech recognition on the second electrical signal and obtaining a preset control instruction.

4. The method according to claim 3, further comprising:
   prohibiting execution of the preset control instruction.

5. The method according to claim 1, wherein the step of judging that the second electrical signal is an interference signal when within a substantially overlapping time range, the first electrical signal acquired reaches a preset first threshold value and the second electrical signal acquired meets a preset condition comprises:
   synchronously acquiring the first electrical signal and the second electrical signal;
   starting time counting when the first electrical signal acquired at a same time point reaches a preset first threshold value and the second electrical signal acquired at the same time point reaches a preset second threshold value; and
   judging that the second electrical signal is an interference signal when speech recognition is performed on the second electrical signal and a preset control instruction is obtained within a preset time period.

6. The method according to claim 5, wherein the step of judging that the second electrical signal is an interference signal when speech recognition is performed on the second electrical signal and a preset control instruction is obtained within a preset time period comprises:
   judging whether the second electrical signal matches a preset speech recognition model; and
   if yes, determining that the speech recognition is performed on the second electrical signal and the preset control instruction is obtained.

7. The method according to claim 6, further comprising:
   shielding the interference signal.

8. The method according to claim 6, further comprising:
   prohibiting execution of the preset control instruction.

9. The method according to claim 5, further comprising:
   shielding the interference signal.

10. The method according to claim 5, further comprising:
    prohibiting execution of the preset control instruction.

11. The method according to claim 1, further comprising:
    shielding the interference signal.

12. The method according to claim 1, further comprising:
    outputting the second electrical signal when the first electrical signal does not reach the preset first threshold value.

13. A signal processing device of a MEMS microphone, comprising: a processor and a memory, wherein the memory stores computer instructions, and when the computer instructions are run by the processor, the method according to claim 1 is executed.

14. The signal processing device according to claim 13, wherein the preset condition that the second electrical signal meets comprises:

the second electrical signal reaches a preset second threshold value.

15. The signal processing device according to claim 13, wherein the preset condition that the second electrical signal meets comprises:

performing speech recognition on the second electrical signal and obtaining a preset control instruction.

16. The signal processing device according to claim 13, wherein the step of judging that the second electrical signal is an interference signal when within a substantially overlapping time range, the first electrical signal acquired reaches a preset first threshold value and the second electrical signal acquired meets a preset condition comprises:

synchronously acquiring the first electrical signal and the second electrical signal;

starting time counting when the first electrical signal acquired at a same time point reaches a preset first threshold value and the second electrical signal acquired at the same time point reaches a preset second threshold value; and judging that the second electrical signal is an interference signal when speech recognition is performed on the second electrical signal and a preset control instruction is obtained within a preset time period.

17. A signal processing device of a MEMS microphone, comprising:

a first acquisition module for acquiring a first electrical signal obtained by converting a received optical signal by an optical sensor disposed near a sound hole of the MEMS microphone;

a second acquisition module for acquiring a second electrical signal output by the MEMS microphone; and a judgment module for judging that the second electrical signal is an interference signal when within a substantially overlapping time range, the first electrical signal acquired reaches a preset first threshold value and the second electrical signal acquired meets a preset condition.

* * * * *